US008310773B2

(12) United States Patent
Kurosawa et al.

(10) Patent No.: US 8,310,773 B2
(45) Date of Patent: Nov. 13, 2012

(54) TORIC MOTOR AND LENS BARREL HAVING THE SAME INCORPORATED THEREIN

(75) Inventors: Yuichi Kurosawa, Tokyo (JP); Hiroaki Suzuki, Saitama (JP)

(73) Assignee: Pentax Ricoh Imaging Company, Ltd, Tokyo (JP)

( * ) Notice: Subject to any disclaimer, the term of this patent is extended or adjusted under 35 U.S.C. 154(b) by 142 days.

(21) Appl. No.: 12/689,304

(22) Filed: Jan. 19, 2010
(Under 37 CFR 1.47)

(65) Prior Publication Data

US 2011/0007408 A1   Jan. 13, 2011

(30) Foreign Application Priority Data

Jan. 21, 2009   (JP) .................................. 2009-010611

(51) Int. Cl.
*G02B 7/02* (2006.01)
*G02B 15/14* (2006.01)

(52) U.S. Cl. ......... 359/824; 359/823; 359/694; 359/696
(58) Field of Classification Search .......... 359/694–704, 359/811–824
See application file for complete search history.

(56) References Cited

U.S. PATENT DOCUMENTS

| 6,128,141 A * | 10/2000 | Sato et al. ..................... 359/696 |
| 7,612,556 B2 * | 11/2009 | Inoue ....................... 324/207.25 |
| 7,712,967 B2 * | 5/2010 | Sekimoto et al. ............. 384/507 |

FOREIGN PATENT DOCUMENTS

JP   10-319298   12/1998

* cited by examiner

*Primary Examiner* — Mohammed Hasan
(74) *Attorney, Agent, or Firm* — Greenbaum & Bernstein, P.L.C.

(57) ABSTRACT

A toric motor includes a toric stator, a toric rotor configured to rotate along the stator, and a bearing configured to support the rotor so as to be rotatable relative to the stator, the bearing comprising a single-row four-point-contact angular ball bearing.

21 Claims, 5 Drawing Sheets

TORIC MOTOR AND LENS BARREL HAVING THE SAME INCORPORATED THEREIN

BACKGROUND OF THE INVENTION

The following description relates to one or more toric motors adapted to be incorporated into a lens barrel of a camera so as to drive a lens mechanism.

A toric motor has been used as a driving source for automatically driving a lens mechanism of a lens-replaceable camera. The toric motor generally has a stator and a rotor formed to be ring-shaped, respectively, which rotor is driven to be rotated in a circumferential direction. As examples of a motor of this type, an ultrasonic motor and a brushless motor have been proposed. For instance, a surface wave motor is employed as a motor of this type in Japanese Patent Provisional Publication No. HEI10-319298 (hereinafter referred to as '298 Publication). In the surface wave motor, a toric rotor is disposed around an outer circumferential surface of a toric stator, and rotatably supported by bearings around the stator. Further, a pressing member presses the rotor against the stator in an optical axis direction such that the rotor comes into a frictional contact with the rotor under a predetermined pressure. Thereby, due to a surface wave generated on the side of the stator, the rotor is rotated to drive a lens mechanism linked therewith.

SUMMARY OF THE INVENTION

In the meantime, a toric motor of this type has to be configured such that the rotor is supported by the stator in a rotatable and stable manner, so as to ensure smooth rotation of the rotor. The motor of '298 Publication is a surface wave motor configured to bring the stator into contact with the rotor in an optical axis direction, i.e., a thrust direction (a rotational axis direction). Therefore, only by using a single bearing for supporting the rotor to be rotatable while regulating the position of the rotor relative to the stator in a radial direction, the rotor can be supported stably by two points, i.e., respective contact points with the bearing and the stator. The same applies to the ultrasonic motor.

However, in a toric motor configured without contact between the rotor and the stator, e.g., as a toric brushless motor, the rotor is required, for achieving stable rotation of the rotor, to be rotatably supported in a state where the position of the rotor is regulated in both the thrust direction and the radial direction. Therefore, the rotor has to be supported by bearings for regulating the position of the rotor relative to the stator in the radial direction which bearings are disposed in at least two positions in the optical axis direction. In general, with being supported by two ball bearings disposed to face each other across the stator in the optical axis direction, the rotor can be supported to be rotatable in a stable and smooth manner without being decentered. Hence, the toric motor has to be designed to secure spaces for the two bearings. It results in difficulties in downsizing the toric motor in the optical axis direction and the radial direction and thus in downsizing a lens into which the motor of this type is incorporated.

Aspects of the present invention are advantageous to provide one or more improved toric motors each of which makes it possible to reduce the sizes thereof and a lens barrel in which the toric motor is incorporated.

According to aspects of the present invention, a toric motor is provide, which includes a toric stator, a toric rotor configured to rotate along the stator, and a bearing configured to support the rotor so as to be rotatable relative to the stator, the bearing including a single-row four-point-contact angular ball bearing.

Optionally, a ball of the bearing may be disposed adjacent to the stator in a rotational axis direction of the toric motor, outside an inner circumferential surface of the stator in a radial direction of the toric motor.

Optionally, the bearing may include a ball bearing that has a plurality of balls arranged on an identical circumference, each of the balls is supported by the stator and the rotor, in contact with two points of each of the stator and the rotor.

Still optionally, the stator may include a recessed groove that has two slanted side faces formed to face each other across each of the balls in a rotational axis direction of the toric motor, each of the slanted side faces being configured to establish point contact with each of the balls. In this case, the rotor may include two slanted surfaces formed to face each other across each of the balls in the rotational axis direction of the toric motor. Further, each of the slanted surfaces may be configured to establish point contact with each of the balls.

Yet optionally, the rotor may include a rotor yoke configured to revolve around the stator, a rotor tube fixed to the rotor yoke, the rotor tube having a first one of the two slanted surfaces, and a lock washer having a second one of the two slanted surfaces. In this case, the lock washer may be attached integrally to the rotor tube such that the second slanted surface presses the balls and brings each of the balls into contact with the first slanted surface and the two slanted side faces of the recessed groove of the stator.

Further optionally, the first slanted surface of the rotor tube may be disposed to face a first one of the two slanted side faces of the recessed groove of the stator across each of the balls in a first direction. In this case, the second slanted surface of the rotor tube may be disposed to face a second one of the two slanted side faces of the recessed groove of the stator across each of the balls in a second direction substantially perpendicular to the first direction.

Optionally, the toric motor may include an outer-rotor type of brushless motor configured such that the rotor rotates around an outer circumference of the stator.

Still optionally, the lock washer may be linked with a body to be driven by the toric motor.

Yet optionally, the lock washer may extend to an inner circumferential side of the toric motor so as to rotate the body to be driven which body is located on the inner circumferential side of the toric motor.

Optionally, the toric motor may be configured to be incorporated into a lens barrel so as to drive a lens frame supporting a lens inside the lens barrel.

According to aspects of the present invention, further provided is a lens barrel, which includes a fixed tube, a cam tube supported by the fixed tube rotatably relative to the fixed tube around an optical axis direction of the lens barrel, a lens frame engaged with the cam tube so as to be movable relative to the fixed tube in the optical axis direction, a lens supported by the lens frame, and a toric motor configured to rotate the cam tube. The toric motor includes a toric stator, a toric rotor configured to rotate along the stator, the rotor being linked with the cam tube, and a bearing configured to support the rotor so as to be rotatable relative to the stator, the bearing comprising a single-row four-point-contact angular ball bearing.

Optionally, the rotor may include a rotor yoke configured to rotate around the stator, a rotor tube fixed to the rotor yoke, and a lock washer attached integrally to the rotor tube. In this case, the lock washer may be linked with the cam tube.

Still optionally, the lock washer may extend to an inner circumferential side of the toric motor so as to rotate the cam tube located on the inner circumferential side of the toric motor.

DETAILED DESCRIPTION OF THE EMBODIMENTS

It is noted that various connections are set forth between elements in the following description. It is noted that these connections in general and, unless specified otherwise, may be direct or indirect and that this specification is not intended to be limiting in this respect.

Figure 1:
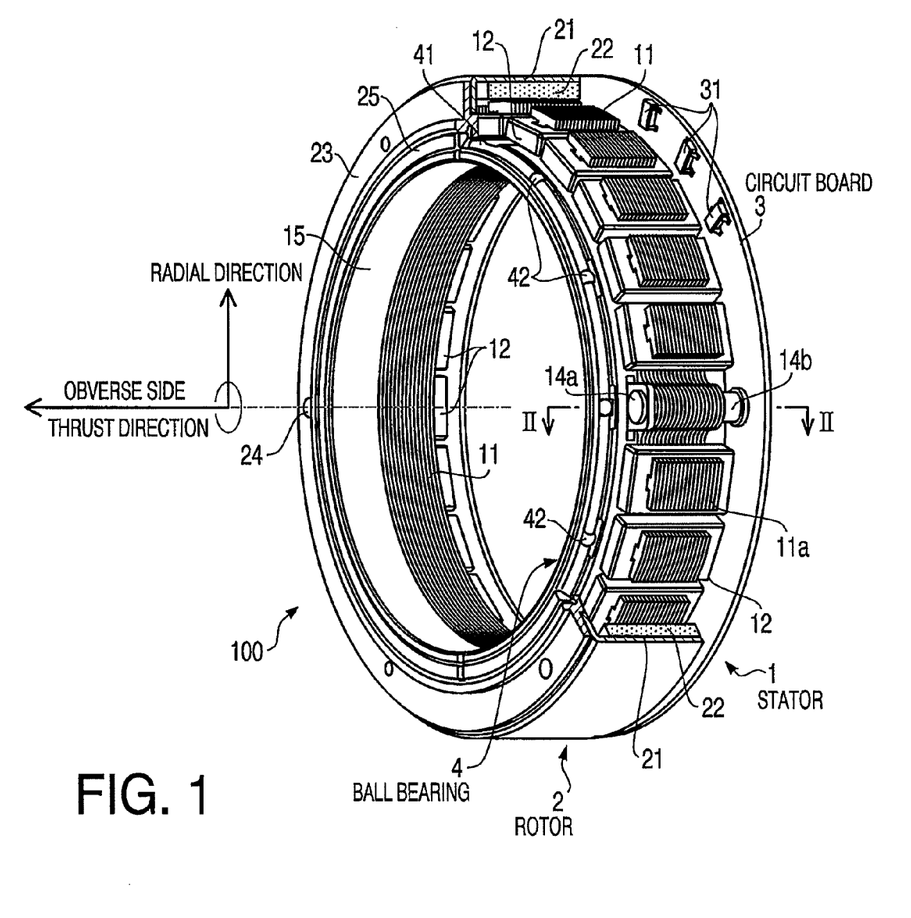
FIG. 1 is a perspective view of a toric motor, of which the inside is partially exposed, in an embodiment according to one or more aspects of the present invention.
Figure 2:
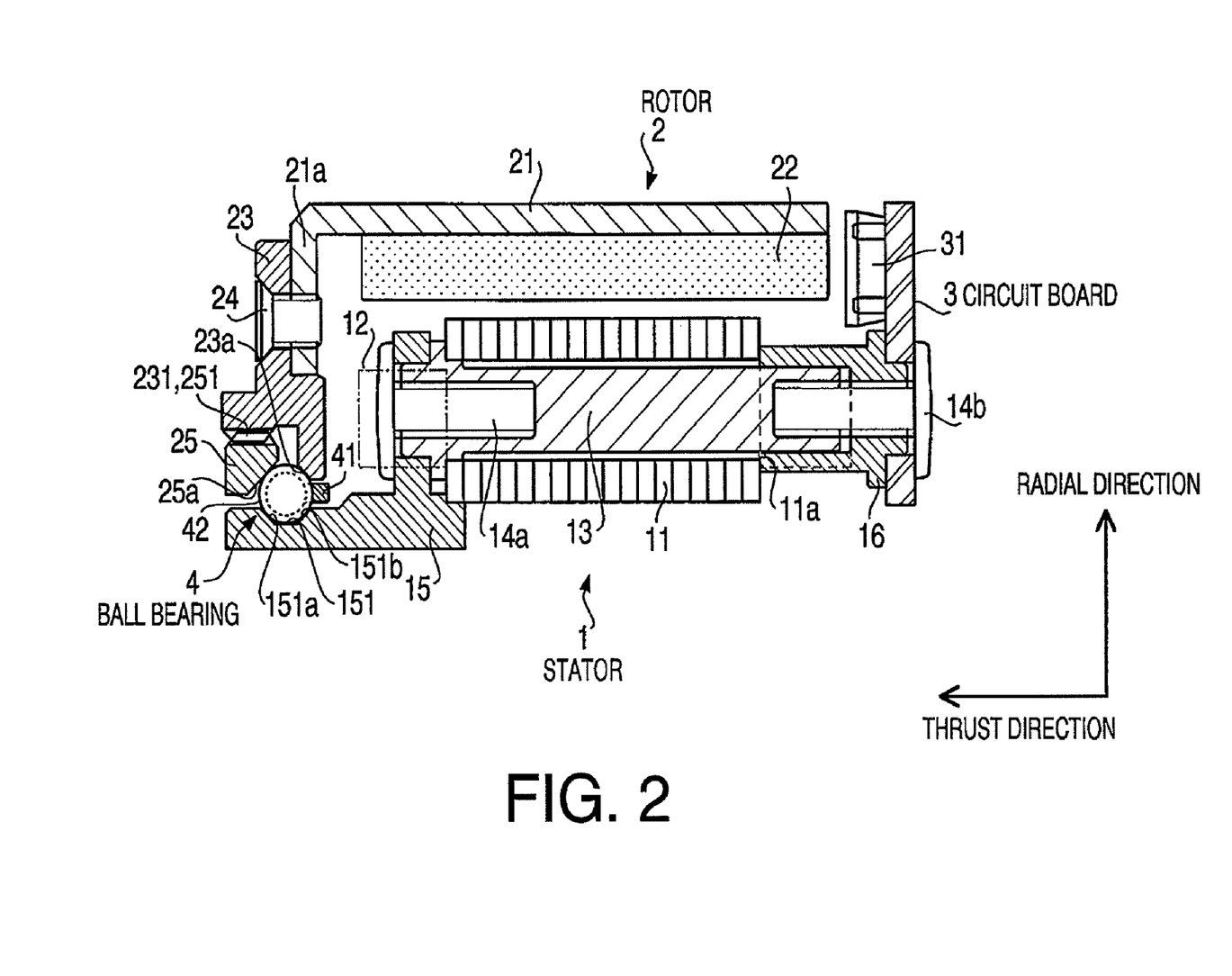
FIG. 2 is a cross-sectional view of the toric motor along a II-II line shown in FIG. 1 in the embodiment according to one or more aspects of the present invention.

Hereinafter, an embodiment according to aspects of the present invention will be set forth with reference to the accompanying drawings. It is noted that in the following descriptions, an obverse side and a reverse side are defined as shown in each of the drawings for the sake of explanatory convenience. FIG. 1 is a perspective view of a toric motor 100, of which the inside is partially exposed, according to aspects of the present invention. FIG. 2 is a cross-sectional view of the toric motor 100 along a II-II line shown in FIG. 1. The toric motor 100 is configured as an outer-rotor type of brushless motor, in which a rotor 2 is disposed outside a stator 1 in a rotatable manner. The stator 1 has a plurality of stator cores 11, each of which is configured with a plurality of ring-petal-shaped metal plates stacked in a plate thickness direction. Further, each of the metal plates includes a plurality of radially-protruding projections 11a disposed at intervals of a predetermined pitch in a circumferential direction of the toric motor 100. Each coil 12 is configured with a conductive wire being wound around each of the projections 11a so as to surround the projection 11a parallel to the plate thickness direction. When a direct electric current is carried in each of the coils 12, the projection 11a of the coil 12 is excited into one of the north pole and the south pole depending on a direction in which the electric current is carried. Further, a rod-shaped stator core supporting pillar 13 is inserted into a through hole extending in the plate thickness direction, in each of multiple locations in the circumferential directions. The stator core 11 is firmly fixed to a stator tube 15 with a screw 14a tightly driven into an obverse end face of the stator core supporting pillar 13. Additionally, a ring-shaped circuit board 3 is firmly supported with a screw 14b tightly driven into a reverse end face of the stator core supporting pillar 13 via a small-diameter cylindrical spacer 16. The circuit board 3 has a wire pattern formed thereon to link with the coil 12, and three hall sensors 31 disposed in the circumferential direction. Each of the hall sensors 31 is configured with a hall element so as to detect a rotational position of the rotor 2. The circuit board 3 may have an electric power supply and a control circuit for the motor 100 implemented thereon. Alternatively, the circuit board 3 may be connected electrically with a separate electric power supply and a separate control circuit.

The rotor, which is disposed around an outer circumference of the stator core 11, includes a cylindrical rotor yoke 21 with a diameter greater than the stator core 11, and a rotor magnet 22 provided integrally with an inner circumferential surface of the rotor yoke 21. The rotor magnet 22 is configured with a cylindrical magnetic body. The magnetic body is magnetized into north poles and south poles alternately arranged in the circumferential direction at intervals of a pitch corresponding to the aforementioned predetermined pitch of the projections 11a of the stator core 11. Alternatively, the rotor magnet 22 may be configured with multiple separate magnets being bonded integrally to the inner circumferential surface of the rotor yoke 21 such that north poles and south poles are arranged alternately. The rotor magnet 22 is disposed with an end thereof facing the circuit board 3 being placed close to the hall sensors 31. Each of the hall sensors 31 is switched depending on a magnetic pole of the rotor magnet 22 that faces itself. Further, the rotor yoke 21 has a flange 21a provided at an end thereof opposite to the circuit board 3, which flange 21a extends inward in a radial direction of the toric motor 100. The flange 21a is fixed, with a screw 24, to a rotor tube 23 short in a thrust direction (a rotational axis direction) of the toric motor 100.

Figure 3:
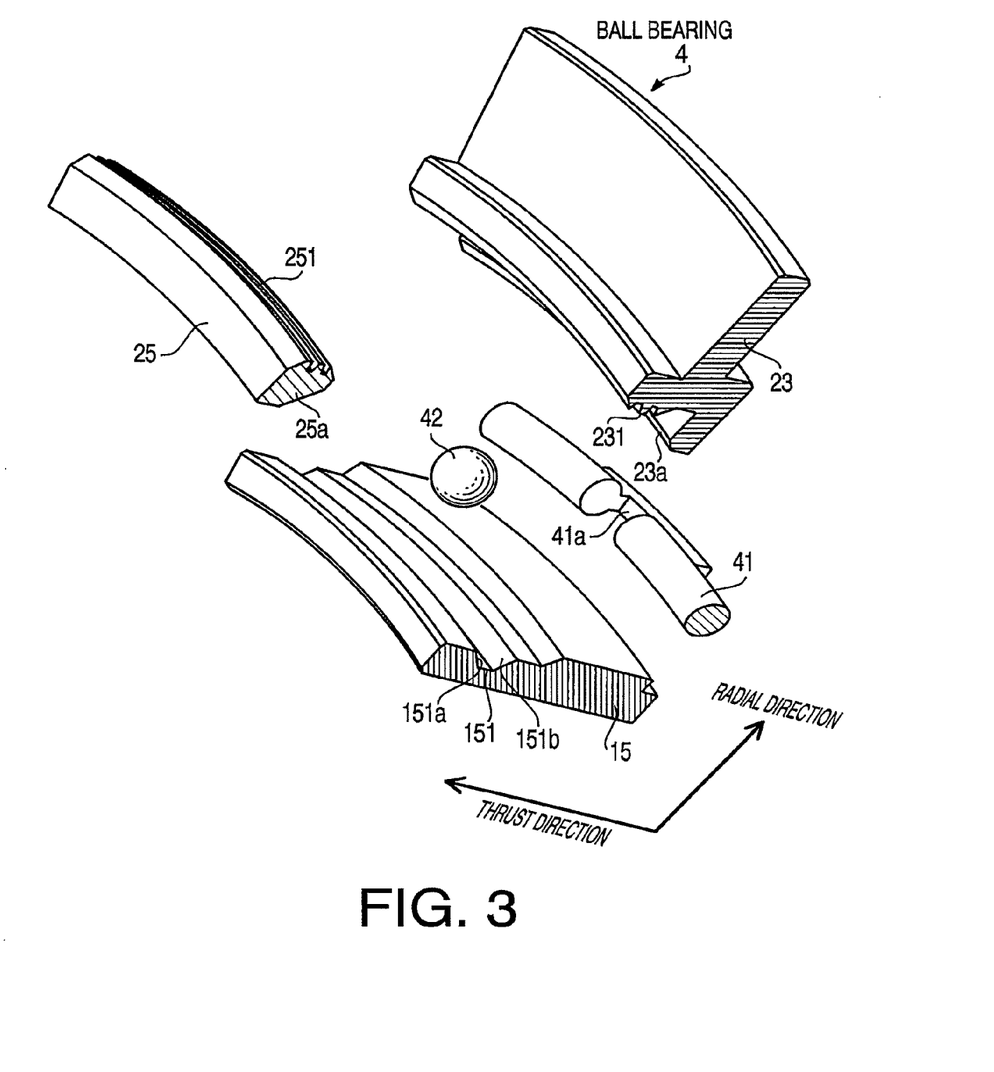
FIG. 3 is an exploded perspective view showing a ball bearing in the embodiment according to one or more aspects of the present invention.

The rotor tube 23 is supported by a ball bearing 4, rotatably relative to the stator tube 15 which fixes the stator core 11, in the circumferential direction, i.e., around an axis of the toric motor 100. The ball bearing 4 is configured with a single-row four-point-contact angular ball bearing. FIG. 3 is an exploded perspective view showing the ball bearing 4. Respective distal ends of the stator tube 15 and the rotor tube 23 are placed to face each other across a small gap in the radial direction. In the small gap, a retainer 41 is inserted, which is formed to circularly extend with a circle cross-section. The retainer 41 has ball supporting grooves 41a recessed toward the reverse side at a plurality of locations in the circumferential direction. Each of the ball supporting grooves 41a supports a ball 42. Thereby, the multiple balls 42 are arranged in a single row in the circumferential direction along the retainer 41. Further, the balls 42 are located outside an inner circumferential surface of the stator tube 15 in the radial direction and adjacent to the stator core 11 in the thrust direction of the toric motor 100. In addition, a recessed groove 151 is formed, with a trapezoidal cross-section, on an outer circumferential surface of a distal end of the stator tube 15 that faces each of the balls 42. Each ball 42 establishes contact, at two points on a spherical surface thereof, with slanted side faces 151a and 151b of the recessed groove 151. Moreover, the rotor tube 23 has an inner slanted surface 23a formed on an inner circumferential surface thereof that faces the recessed groove 151. The inner slanted surface 23a establishes contact with another point on the spherical surface of each ball 42. Furthermore, a lock washer 25 is screwed into the rotor tube 23 with an external thread formed on an outer circumferential surface of the lock washer 25 being driven into an internal thread formed on an inner circumferential surface of the rotor tube 23. The lock washer 25 has an outer slanted surface 25a formed on an inner circumferential surface thereof. The outer slanted surface 25a contacts a point on the spherical surface of the ball 42 which point is opposite the contact point of the inner slanted surface 23*a* in the thrust direction of the toric motor 100.

Thus, the ball 42 of the ball bearing 4 establishes contact, at the different four points on the spherical surface thereof, with the slanted side faces 151*a* and 151*b* of the recessed groove 151 provided to the stator tube 15, the inner slanted surface 23*a* of the rotor tube 23, and the outer slanted surface 25*a* of the lock washer 25, respectively. Thereby, the ball 42 is gripped, at the different four points on the spherical surface thereof, by the slanted side faces 151*a* and 151*b*, the inner slanted surface 23*a*, and the outer slanted surface 25*a*. In other words, when the lock washer 25 is screwed into the rotor tube 23, and a pressing force is concurrently applied to the ball 42 from the outer slanted surface 25*a*, the ball 42 comes into contact with the slanted side faces 151*a* and 151*b*, and the inner slanted surface 23*a*. Thus, the ball 42 is gripped by the four surfaces. In this situation, the inner slanted surface 23*a* and the slanted side face 151*a* of the recessed groove 151 are disposed to face each other across the ball 42, so as to pinch the ball 42 in a radial direction of the ball 42 (hereinafter referred to as a first predetermined direction). Further, the outer slanted surface 25*a* and the slanted side face 151*b* of the recessed groove 151 are disposed to face each other across the ball 42, so as to pinch the ball 42 in a radial direction of the ball 42 (hereinafter referred to as a second predetermined direction). Moreover, the first predetermined direction and the second predetermined direction are substantially perpendicular to each other. Furthermore, the slated surfaces 23*a* and 25*a* and the slanted side faces 151*a* and 151*b* are slanted in different directions from both the radial direction and the thrust direction (the rotational axis direction) of the toric motor 100, respectively. Thereby, the ball 42 is gripped by the stator tube 15, the rotor tube 23, and the lock washer 25, in a state where the position of the ball 42 is tightly regulated in both the radial direction and the thrust direction. In other words, the rotor 2 is supported stably and rotatably in a state where the position thereof is restricted relative to the stator 1 in both the radial direction and the thrust direction.

The toric motor 100 is configured such that the rotor 2 is driven and rotated relative to the stator 1 based on the same principle as a known brushless motor. A concise explanation about it will be provided as follows. By controlling directions in which electric currents are conveyed through the plurality of coils 12 provided to the stator core 11, the projections 11*a* of the stator core 11 are magnetized such that the north poles and the south poles are alternately arranged in the circumferential direction at intervals of the predetermined pitch. Thereby, a repulsive force and an attractive force are generated between the projections 11*a* of the stator core 11 and the magnetized rotor magnet 22 of the rotor core 21. Owing to these forces, the rotor core 21 is rotated by a small angle corresponding to the interval (pitch) of the projections 11*a* of the stator core 11. Subsequently, by switching the directions of the electric currents conveyed through the coils 12 of the stator core 11, the north poles and the south poles of the stator core 11 are reversed. Thereby, the repulsive force and the attractive force, which are generated between the projections 11*a* of the stator core 11 and the magnetized rotor magnet 22 of the rotor core 21, are reversely switched. Thus, the rotor core 21 is further rotated by the small angle. When the operations are repeatedly performed, the rotor core 21 is continuously rotated in a single direction. The direction of the electric current conveyed through each of the coils of the stator core 11 is appropriately controlled in synchronization with detection of a rotational position of the rotor magnet 22 by the hall sensors 31.

As described above, the toric motor 100 is configured such that the rotor 2 is rotatably supported around the stator 1 by the single ball bearing 1, which is configured as a single-row four-point-contact angular ball bearing, in the state where the position of the rotor 2 is restricted in both the radial direction and the thrust direction. Therefore, the rotor 2 can be rotated in a stable and smooth manner without being decentered. Hence, the toric motor 100 does not need two or more bearings. Thus, it is possible to reduce a space for a bearing and downsize the toric motor 100 in the thrust and radial directions. In addition, the ball 42 of the ball bearing 4 is disposed outside the inner circumferential surface of the stator tube 15 in the radial direction and adjacent to the stator tube 15 in the thrust direction. Therefore, a space is required for placing the ball bearing 4 in the thrust direction. Nevertheless, it is possible to make a dimension of the toric motor 100 in the thrust direction shorter than that in the case of two or more bearings disposed. Further, even when a required inner diameter is secured for the toric motor 100, it is possible to avoid increase of an outer diameter of the toric motor 100. Thus, it is possible to downsize the toric motor 100.

First Practical Example

Figure 4:
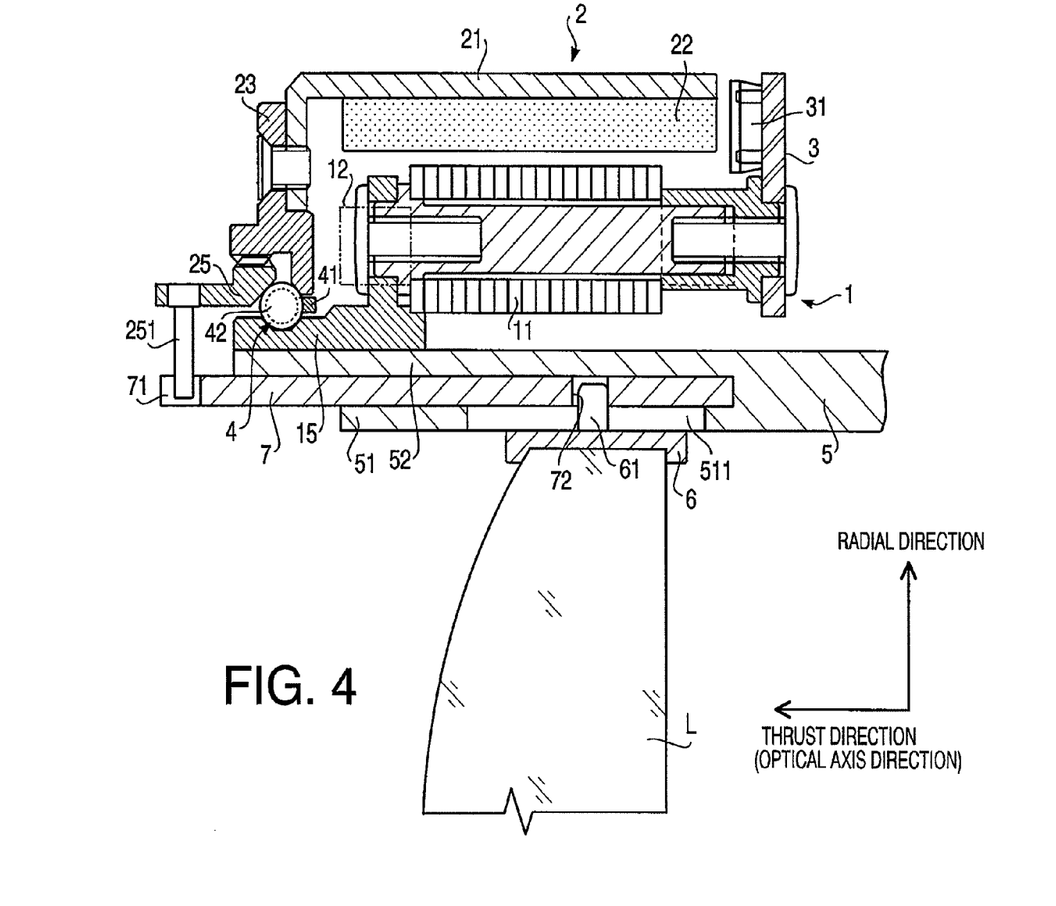
FIG. 4 is a cross-sectional view schematically showing a first practical example in which the toric motor is applied to a replaceable lens for a single-lens reflex camera, in the embodiment according to one or more aspects of the present invention.

FIG. 4 is a cross-sectional view schematically showing a first practical example in which the toric motor 100 of the embodiment according to aspects of the present invention is applied to a replaceable lens for a single-lens reflex camera. Inside an inner fixed tube 51 of a fixed tube 5 constituting a lens barrel, a lens frame 6 supporting a lens L is incorporated to be movable in an optical axis direction. A cam tube 7 is inserted in a small gap between the inner fixed tube 51 and an outer fixed tube 52 of the fixed tube 5 that is disposed a distance of the small gap away from the inner fixed tube 51 in the radial direction. The cam tube 7 is configured to be rotatable around an axis line of the lens barrel, i.e., the optical axis of the lens L. The cam tube 7 has a notch 71 provided at a distal end thereof. Further, the cam tube 7 has a required shape of cam groove 72 formed on a circumferential surface thereof. The inner fixed tube 51 has a guide groove 511, corresponding to the cam groove 72, which is formed to extend in the optical direction. A cam rod 61, which is provided on a circumferential surface of the lens frame 6 in a manner protruding in the radial direction, penetrates the guide groove 511 of the inner fixed tube 51, so as to be inserted into and engaged with the cam groove 72 of the cam tube 7.

The stator tube 15 of the toric motor 100 is fixed to an outer circumferential surface of the outer fixed tube 52. In addition, the lock washer 25 of the toric motor 100 includes an engagement pin 251 that protrudes inward in the radial direction. The engagement pin 251 is engaged with the notch 71 of the cam tube 7, so that the cam tube can be rotated integrally with the lock washer 25.

In the lens barrel of the first practical example, when the toric motor 100 is driven and the rotor 2 is rotated, the rotor tube 23 configured integrally with the rotor 2 and the lock washer 25 screwed into the rotor 2 are rotated. The rotation of the lock washer 25 is transmitted to the cam tube 7 through the engagement pin 251. Then, the cam tube 7 is rotated along the outer circumferential surface of the inner fixed tube 51. Thereby, the cam rod 61 is moved in the optical axis direction along the shape of the cam groove 72 while being guided by the guide groove 511. Further, the lens frame 6 integrated with the cam rod 61, namely, the lens L is moved in the optical axis direction. Thus, zooming and focusing are performed in the lens barrel.

In the first practical example, the toric motor 100 includes the single ball bearing 4, which is configured as a single-row four-point-contact angular ball bearing. Therefore, it is possible to stably support the rotor 2 relative to the stator 1 and achieve stable rotation of the rotor 2. Further, the toric motor 100 is advantageous to contribute to downsizing the lens barrel, which has the toric motor 100 incorporated thereinto that is downsized in both the thrust direction and the radial directions in comparison with a motor that requires two or more bearings. In particular, as the ball bearing 4 is disposed outside the inner circumferential surface of the stator tube 15 in the radial direction, the inner diameter of the stator 1 is not reduced due to the ball bearing 4. Further, as the ball bearing 4 is disposed adjacent to the stator core 11 in the thrust direction, the outer diameter of the toric motor 100 is not enlarged. Accordingly, even when a required inner diameter has to be secured for the toric motor 100, the outer diameter of the toric motor 100, i.e., the lens barrel is not enlarged. Thus, it is possible to realize a lens barrel with a small outer diameter.

Second Practical Example

Figure 5:
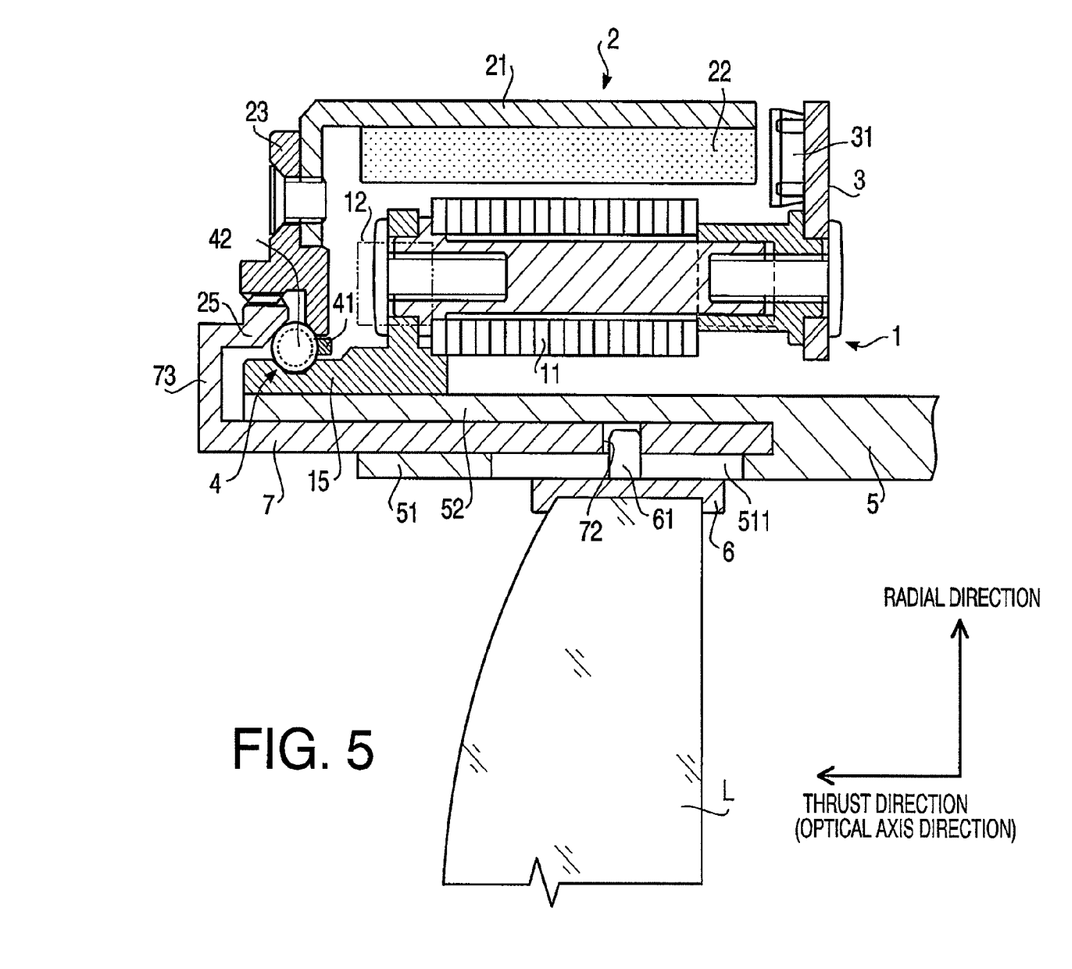
FIG. 5 is a cross-sectional view schematically showing a second practical example as a modification of the first practical example in the embodiment according to one or more aspects of the present invention.

FIG. 5 is a cross-sectional view schematically showing a second practical example as a modification of the first practical example. In the second practical example illustrated in FIG. 5, the same elements as the first practical example shown in FIG. 4 have the same reference characters attached thereto, respectively, and explanation about them will be omitted. In the second practical example, a lock washer 25 is formed integrally with a cam tube 7. Specifically, the cam tube 7 has an outer flange 73 formed integrally with a distal end thereof, and the outer flange 73 has the lock washer 25 formed integrally with an outer end thereof in the radial direction. Here, although the outer flange 73 and the lock washer 25 are formed as an integrated member, the outer flange 73 and the lock washer 25 may be screwed together with respective threads provided thereto being engaged with each other. According to this configuration, it is needless to describe that when the toric motor 100 is rotated and the lock washer 25 is rotated, the cam tube 7, which is formed integrally with the lock washer 25, is rotated, and the lens L is moved in the optical axis direction in the same manner as the first practical example.

In the second practical example, by attaching the lock washer 25 to the toric motor 100 when the toric motor 100 is incorporated into the lens barrel, the cam tube 7 can concurrently be incorporated into the lens barrel. In addition, the engagement pin 251 or the notch 71 as provided in the first practical example is not required for connecting the lock washer 25 with the cam tube 7, it is possible to reduce the number of components included in the toric motor 100. Further, it is possible to downsize the lens barrel in the same manner as described in the first practical example.

Hereinabove, the embodiment according to aspects of the present invention have been described. The present invention can be practiced by employing conventional materials, methodology and equipment. Accordingly, the details of such materials, equipment and methodology are not set forth herein in detail. In the previous descriptions, numerous specific details are set forth, such as specific materials, structures, processes, etc., in order to provide a thorough understanding of the present invention. However, it should be recognized that the present invention can be practiced without reapportioning to the details specifically set forth. In other instances, well known processing structures have not been described in detail, in order not to unnecessarily obscure the present invention.

An only exemplary embodiment of the present invention and but a few examples of its versatility are shown and described in the present disclosure. It is to be understood that the present invention is capable of use in various other combinations and environments and is capable of changes or modifications within the scope of the inventive concept as expressed herein.

It is noted that the rotation of the lock washer 25 may be transmitted to the cam tube 7 in a decelerated or accelerated manner. For example, an internal gear may be formed on the inner circumferential surface of the lock washer 25. Additionally, outer teeth may be formed as a sun gear, in a position corresponding to the lock washer 25 in the radial direction, on the outer circumferential surface of the inner fixed tube 51. Further, one or more planet gears may be engaged between the internal gear and the sun gear. In this case, the rotational axes of the planet gears may be supported by the cam tube 7.

When the toric motor 100 is rotated and the lock washer 25 is rotated, the planets gears are revolved in the circumferential direction while being rotated around respective rotational axes thereof. Thereby, the cam tube 7 is rotated by a planet gear mechanism, and thus the lens L is moved in the optical axis direction in the same manner as the aforementioned first or second practical example.

In the aforementioned embodiment, aspects of the present invention are applied to an outer rotor type of toric motor 100. Nevertheless, aspects of the present invention may as well be applied to an inner rotor type of toric motor 100. Even when aspects of the present invention are applied to such an inner type of toric motor 100, it is possible to reduce a space to place one or more additional bearings, and to downsize the toric motor 100.

The present disclosure relates to the subject matter contained in Japanese Patent Application No. P2009-010611, filed on Jan. 21, 2009, which is expressly incorporated herein by reference in its entirety.

What is claimed is:

1. A toric motor comprising:
   an outer-rotor type motor that comprises:
   a toric stator;
   a toric rotor configured to rotate along and around an outer circumference of the stator; and
   a bearing configured to support the rotor so as to be rotatable relative to the stator, the bearing comprising a single-row four-point-contact angular ball bearing.

2. The toric motor according to claim 1,
   wherein a ball of the bearing is disposed adjacent to the stator in a rotational axis direction of the toric motor, outside an inner circumferential surface of the stator in a radial direction of the toric motor.

3. The toric motor according to claim 1,
   wherein the bearing comprises a ball bearing that has a plurality of balls arranged on an identical circumference, each of the balls is supported by the stator and the rotor, in contact with two points of each of the stator and the rotor.

4. The toric motor according to claim 3,
   wherein the stator comprises a recessed groove that has two slanted side faces formed to face each other across each of the balls in a rotational axis direction of the toric motor, each of the slanted side faces being configured to establish point contact with each of the balls, and
   wherein the rotor comprises two slanted surfaces formed to face each other across each of the balls in the rotational axis direction of the toric motor, each of the slanted surfaces being configured to establish point contact with each of the balls.

5. The toric motor according to claim 4,
wherein the rotor comprises:
   a rotor yoke configured to revolve around the stator;
   a rotor tube fixed to the rotor yoke, the rotor tube comprising a first one of the two slanted surfaces; and
   a lock washer comprising a second one of the two slanted surfaces, the lock washer being attached integrally to the rotor tube such that the second slanted surface presses the balls and brings each of the balls into contact with the first slanted surface and the two slanted side faces of the recessed groove of the stator.

6. The toric motor according to claim 5,
wherein the first slanted surface of the rotor tube is disposed to face a first one of the two slanted side faces of the recessed groove of the stator across each of the balls in a first direction, and
wherein the second slanted surface of the rotor tube is disposed to face a second one of the two slanted side faces of the recessed groove of the stator across each of the balls in a second direction substantially perpendicular to the first direction.

7. The toric motor according to claim 1, wherein the outer-rotor type motor is a brushless motor.

8. The toric motor according to claim 7,
wherein the rotor comprises:
   a rotor yoke configured to rotate around the stator;
   a rotor tube fixed to the rotor yoke; and
   a lock washer attached integrally to the rotor tube, the lock washer being linked with a body to be driven by the toric motor.

9. The toric motor according to claim 8,
wherein the lock washer extends to an inner circumferential side of the toric motor so as to rotate the body to be driven which body is located on the inner circumferential side of the toric motor.

10. The toric motor according to claim 1, configured to be incorporated into a lens barrel so as to drive a lens frame supporting a lens inside the lens barrel.

11. A lens barrel comprising:
a fixed tube;
a cam tube supported by the fixed tube rotatably relative to the fixed tube around an optical axis direction of the lens barrel;
a lens frame engaged with the cam tube so as to be movable relative to the fixed tube in the optical axis direction;
a lens supported by the lens frame; and
a toric motor configured to rotate the cam tube, the toric motor comprising:
an outer-rotor type motor that comprises:
   a toric stator;
   a toric rotor configured to rotate along and around an outer circumference of the stator, the rotor being linked with the cam tube; and
   a bearing configured to support the rotor so as to be rotatable relative to the stator, the bearing comprising a single-row four-point-contact angular ball bearing.

12. The lens barrel according to claim 11,
wherein a ball of the bearing is disposed adjacent to the stator in a rotational axis direction of the toric motor, outside an inner circumferential surface of the stator in a radial direction of the toric motor.

13. The lens barrel according to claim 11,
wherein the bearing comprises a ball bearing that has a plurality of balls arranged on an identical circumference, each of the balls is supported by the stator and the rotor, in contact with two points of each of the stator and the rotor.

14. The lens barrel according to claim 13,
wherein the stator comprises a recessed groove that has two slanted side faces formed to face each other across each of the balls in a rotational axis direction of the toric motor, each of the slanted side faces being configured to establish point contact with each of the balls, and
wherein the rotor comprises two slanted surfaces formed to face each other across each of the balls in the rotational axis direction of the toric motor, each of the slanted surfaces being configured to establish point contact with each of the balls.

15. The lens barrel according to claim 14,
wherein the rotor comprises:
   a rotor yoke configured to revolve around the stator;
   a rotor tube fixed to the rotor yoke, the rotor tube comprising a first one of the two slanted surfaces; and
   a lock washer comprising a second one of the two slanted surfaces, the lock washer being attached integrally to the rotor tube such that the second slanted surface presses the balls and brings each of the balls into contact with the first slanted surface and the two slanted side faces of the recessed groove of the stator.

16. The lens barrel according to claim 15,
wherein the first slanted surface of the rotor tube is disposed to face a first one of the two slanted side faces of the recessed groove of the stator across each of the balls in a first direction, and
wherein the second slanted surface of the rotor tube is disposed to face a second one of the two slanted side faces of the recessed groove of the stator across each of the balls in a second direction substantially perpendicular to the first direction.

17. The lens barrel according to claim 11, wherein the outer-rotor type motor is a brushless motor.

18. The lens barrel according to claim 17,
wherein the rotor comprises:
   a rotor yoke configured to rotate around the stator;
   a rotor tube fixed to the rotor yoke; and
   a lock washer attached integrally to the rotor tube, the lock washer being linked with the cam tube.

19. The lens barrel according to claim 18,
wherein the lock washer extends to an inner circumferential side of the toric motor so as to rotate the cam tube located on the inner circumferential side of the toric motor.

20. A toric motor comprising:
a toric stator;
a toric rotor configured to rotate along the stator; and
a bearing configured to support the rotor so as to be rotatable relative to the stator, the bearing comprising a single-row four-point-contact angular ball bearing,
wherein the bearing comprises a ball bearing that has a plurality of balls arranged on an identical circumference, each of the balls is supported by the stator and the rotor, and in contact with two points of each of the stator and the rotor,
wherein the stator comprises a recessed groove that has two slanted side faces that face each other across each of the balls in a rotational axis direction of the toric motor, each of the slanted side faces being configured to establish point contact with each of the balls, and
wherein the rotor comprises two slanted surfaces that face each other across each of the balls in the rotational axis direction of the toric motor, each of the slanted surfaces being configured to establish point contact with each of the balls.

21. A lens barrel comprising:
a fixed tube;
a cam tube supported by the fixed tube rotatably relative to the fixed tube around an optical axis direction of the lens barrel;
a lens frame engaged with the cam tube so as to be movable relative to the fixed tube in the optical axis direction;
a lens supported by the lens frame; and
a toric motor configured to rotate the cam tube, the toric motor comprising:
  a toric stator;
  a toric rotor configured to rotate along the stator, the rotor being linked with the cam tube; and
  a bearing configured to support the rotor so as to be rotatable relative to the stator, the bearing comprising a single-row four-point-contact angular ball bearing,
wherein the bearing comprises a ball bearing that has a plurality of balls arranged on an identical circumference, each of the balls is supported by the stator and the rotor, and in contact with two points of each of the stator and the rotor,
wherein the stator comprises a recessed groove that has two slanted side faces that face each other across each of the balls in a rotational axis direction of the toric motor, each of the slanted side faces being configured to establish point contact with each of the balls, and
wherein the rotor comprises two slanted surfaces that face each other across each of the balls in the rotational axis direction of the toric motor, each of the slanted surfaces being configured to establish point contact with each of the balls.

* * * * *